United States Patent [19]

Iannelli

[11] 4,055,198

[45] Oct. 25, 1977

[54] EXCESS PRESSURE RELIEVING VALVE

[75] Inventor: Frank M. Iannelli, Livingston, N.J.

[73] Assignee: Tannetics, Inc., Erie, Pa.

[21] Appl. No.: 640,077

[22] Filed: Dec. 12, 1975

Related U.S. Application Data

[63] Continuation of Ser. No. 497,753, Aug. 15, 1974, abandoned.

[51] Int. Cl.² .............................................. G05D 16/06
[52] U.S. Cl. .................................................. 137/116.5
[58] Field of Search ........................... 137/116.3, 116.5

[56] References Cited

U.S. PATENT DOCUMENTS

| | | | |
|---|---|---|---|
| 2,212,626 | 8/1940 | Thomas | 137/116.5 |
| 2,739,611 | 3/1956 | Cornelius | 137/116.5 |
| 3,032,061 | 5/1962 | Silver | 137/116.5 |
| 3,045,691 | 7/1962 | Young | 137/116.5 |
| 3,071,147 | 1/1963 | Dudzinski | 137/116.5 |
| 3,160,169 | 12/1964 | Peterson | 137/116.5 |
| 3,357,443 | 12/1967 | Brumm | 137/116.5 |
| 3,488,685 | 1/1970 | Hughes | 137/116.5 |
| 3,606,909 | 9/1971 | Kowalski et al. | 137/116.5 |
| 3,712,333 | 1/1973 | Semon | 137/116.5 |
| 3,906,982 | 9/1975 | Fleischhacker et al. | 137/116.5 |

FOREIGN PATENT DOCUMENTS

| | | | |
|---|---|---|---|
| 1,271,157 | 7/1960 | France | 137/116.5 |

*Primary Examiner*—William R. Cline
*Assistant Examiner*—H. Jay Spiegel
*Attorney, Agent, or Firm*—Bailey, Dority & Flint

[57] ABSTRACT

An excess pressure relieving means is illustrated for use with fluid pressure reducing apparatus wherein fluid passes from a high pressure inlet chamber to a reduced pressure outlet chamber and includes a valve member having a relief port carried by a diaphragm which extends across the outlet chamber, a closure member carried by the diaphragm normally closing the fluid relief port, and an operator carried by the closure member engaging a stop which limits movement of the closure member but which permits further movement of the valve member producing a separation of the valve and closure members permitting excess fluid pressure to be dissipated through the relief port.

7 Claims, 3 Drawing Figures

EXCESS PRESSURE RELIEVING VALVE

This is a continuation of application Ser. No. 497,753, filed Aug. 15, 1974, now abandoned.

BACKGROUND OF THE INVENTION

This invention relates to a safety device in the form of an excess pressure relieving valve for use with fluid pressure reducing apparatus. For example, the excess pressure means of this invention are useful in connection with fluid pressure reducing apparatus such as that illustrated in U.S. Letters Pat. No. 3,712,333. The patent illustrates a regulator designed primarily for controlling the flow of carbon dioxide gas and oxygen and maintaining a desired outlet pressure regardless of a drop in the inlet pressure. It is important to relieve excess pressures, for the safety of personnel and equipment, as may occur as a result of a fractured seal or other valve component. Excess pressures may occur for any of a number of reasons including leakage or opening of the valve over outlet setting.

The valve of the patent illustrates the use of an exhaust port for relieving minor excesses in pressure. However, when such valves fail so as to permit substantial surges of fluid under high pressure, the restricted passageway contemplated in the patent, especially when used with carbon dioxide which often freezes blocking such restricted passages is inadequate. Accordingly, it is an important object of this invention to provide a safety device in the form of pressure relieving valve means for use in pressure reducing apparatus which is positive in action and which responds quickly to vent fluid under excess pressure from the reduced pressure chamber of such valves. Pressure relieving devices heretofore on the market are generally spring loaded in line devices which lag or are slow to operate because of the relatively strong spring necessitated in such apparatus.

Another important object of the invention is to provide a versatile safety device which may be used with a variety of fluid pressure reducing valves which lends itself to miniaturization and relatively inexpensive construction.

Another object of the invention is to provide a self-adjusting safety valve operable at a predetermined overpressure to operate with a variety of output pressure settings.

BRIEF DESCEIPTION OF THE INVENTION

It has been found that a pressure relief valve may be provided for use with pressure reducing apparatus wherein a valve member having a fluid relief port is carried by a diaphragm opposite a closure member also carried by the diaphram normally in position to close the fluid relief port. An operator is carried by the closure member and extends into engagement with a stop when excess pressure occurs so that the stop restrains further movement of the closure member but permits further movement of the valve member carried by the diaphragm causing the valve member to separate therefrom opening the relief port permitting fluid to readily escape therethrough immediately upon the occurrence of excess pressure in the pressure reducing apparatus.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
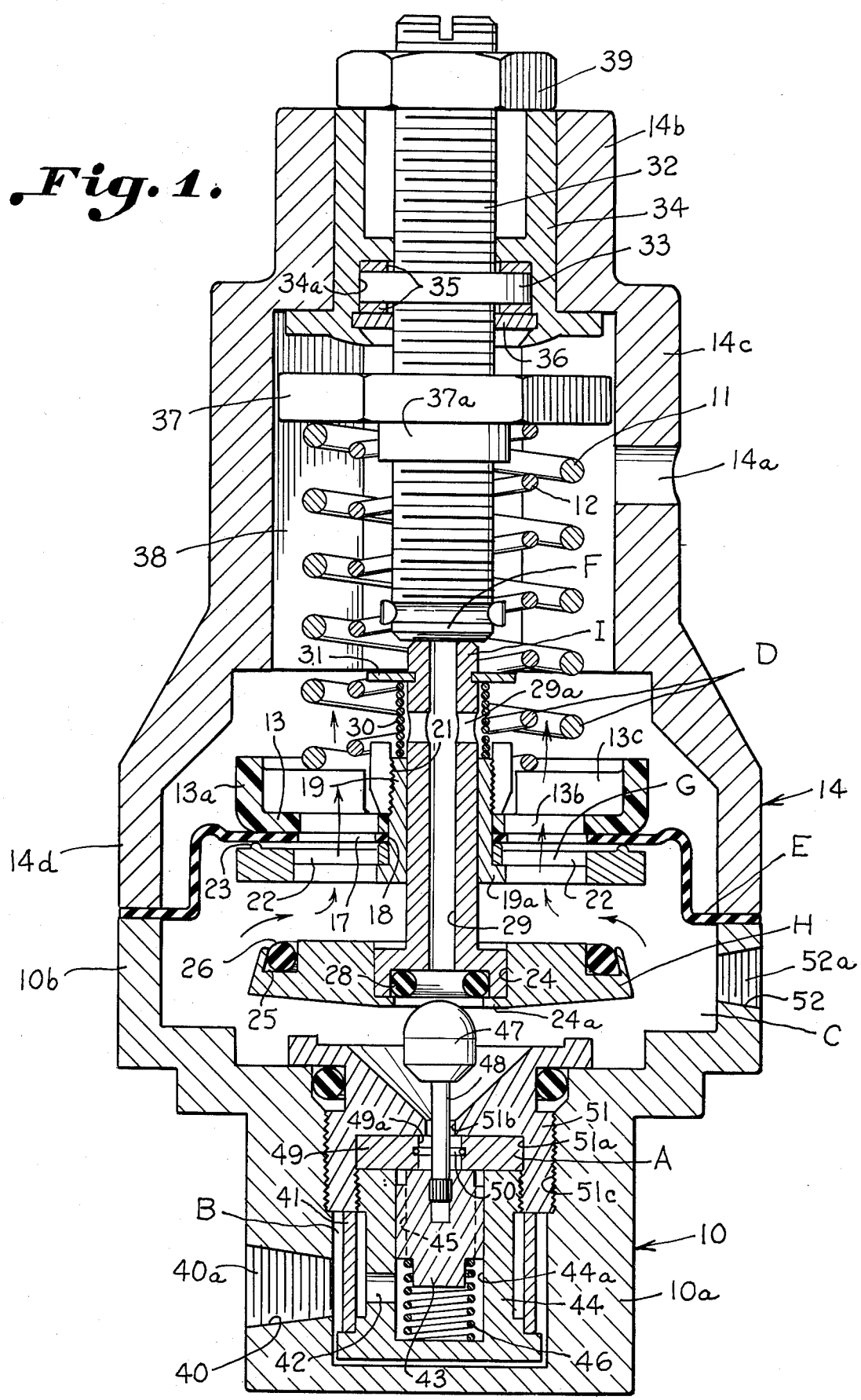
FIG. 1 is a transverse sectional elevation of a safety device for use with fluid pressure reducing apparatus constructed in accordance with the present invention, with the pressure relieving valve of the safety device in open position for relieving excess pressure.

The drawing illustrates a safety device for fluid pressure reducing apparatus having a fluid pressure reducing valve A. Fluid passes through the pressure reducing valve A from a high pressure inlet chamber B to a reduced pressure outlet chamber C. The pressure reducing valve A is operable responsive to a predetermined reduced pressure simulating means D, and a diaphragm E is interposed betweeen the reduced pressure outlet chamber C and the predetermined reduced pressure simulating means D.

The safety device includes a stop F carried at a predetermined position on a side of the diaphragm opposite said fluid pressure reducing valve. A valve member G carried by the diaphram has a fluid relief port communicating with the reduced pressure outlet chamber C. A closure member H is carried by the diaphragm normally in position closing the fluid relief port. An operator I is carried by the closure member in spaced relation with the stop F when the closure member H is in position closing the fluid relief port but which engages the stop, restraining the closure member against further movement when the diaphragm and the valve and closure members carried thereby are moved responsive to an excessive pressure in the reduced pressure outlet chamber. Further movement of the diaphragm and valve member G carried thereby is permitted, however, separating the valve member G from the movable closure member H. Thus, the fluid relief port is opened permitting fluid to escape therethrough relieving excessive pressure in the reduced pressure outlet chamber C as illustrated by the arrows in FIG. 1.

The fluid pressure reducing valve A is illustrated in the form of a valve such as described in U.S. Pat. No. 3,712,333. The valve of the safety device hereof useful, however, with a variety of pressure regulators. The operation of the specific pressure regulator illustrated will be set forth in greater detail below. It should be noted now, however, that the pressure reducing valve A is carried in a lower housing broadly designated at 10 as is the high pressure inlet chamber B. The pressure reducing valve A operates responsive to a suitable pressure simulating means D to produce a fluid output at a predetermined pressure regardless of a drop in inlet pressure. Fluid flows from the high pressure inlet chamber B through the pressure reducing valve A into the reduced or regulated pressure outlet chamber C. The pressure simulating means D includes a pair of coil springs 11 and 12, one of which is carried within the other to exert even predetermined pressure against a disc 13 which has an upstanding flange 13a for confining the springs. The disc 13 also has a plurality of spaced openings 13b. The spaced upstanding ribs 13c provide rigidity and strength to the disc 13 and also provides assurance that the passageway for the flow of excess pressure gas is not restricted by coil springs 11 and 12.

Figure 3:
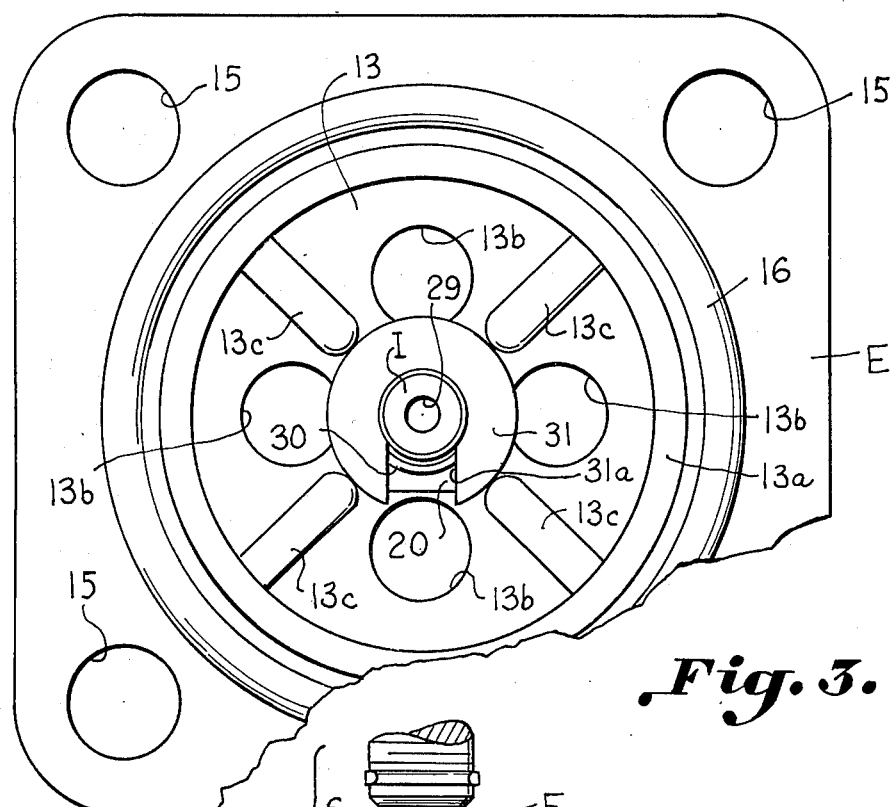
FIG. 3 is a plan view taken on the line 3—3 of FIG. 2.

The diaphragm E is carried in sealing engagement between the lower housing 10 and the upper housing broadly designated at 14. The lower and upper housings 10 and 14 respectively, are secured together by suitable fastening means such as bolts (not shown) which pass through the openings 15 (FIG. 3) in the diaphragm. The upper and lower housings have enlarged portions 14d and 10b engaged in sealing engagement with each other confining the diaphragm E therebetween. The diaphragm E has an axially aligned circumferential pleat illustrated at 16 which permits upward movement of the diaphragm when excess pressure occurs in the reduced pressure chamber C. The diaphragm E has portions 17 complimentary to the portions 13b and has a central opening 18 accommodating a sleeve 19. The stop F is adapted, as will be described below in greater detail, to separate the valve member G from the closure H as illustrated in FIG. 1 so as to open a relief port in the valve member G. It will be observed that the valve member G is carried by the diaphragm E and is positioned thereon between the disc 13 and a lower flange 19a carried by the member 19. An upper retaining member 20 is threaded upon the sleeve 19 as at 21, the diaphragm being confined between the valve member G and the disc 13.

It will be observed that the valve member G has a port formed by a plurality of spaced openings 22 complimentary to the opening 18 in the diaphragm E and the openings 13b in the disc 13. A peripheral sealing member carried by the valve member G is illustrated at 23.

Figure 2:
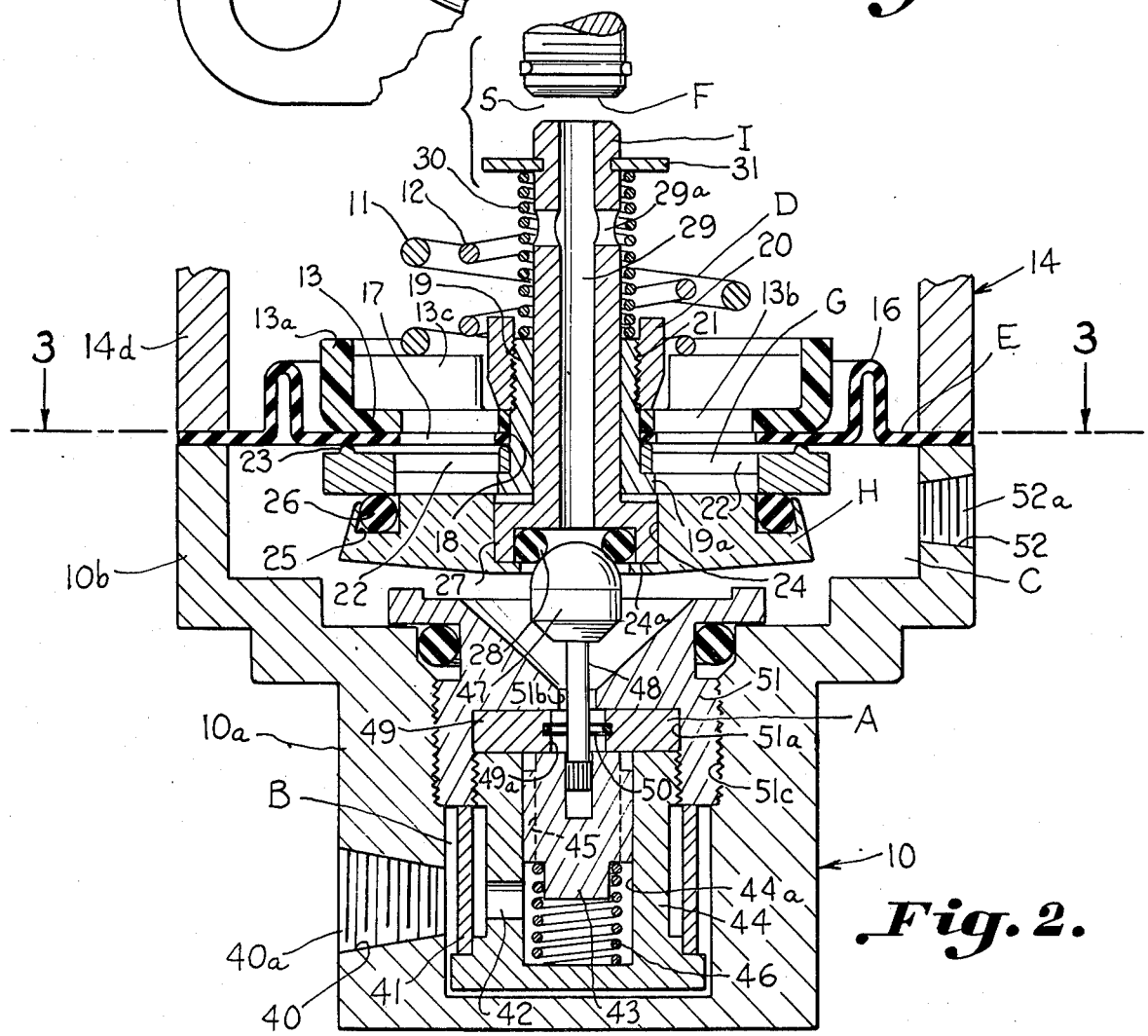
FIG. 2 is a transverse sectional elevation similar to FIG. 1, with parts broken away, illustrating the various components of the mechanism in normal operating position.

The closure member H has an annular central opening 24 for receiving the operator I which bears against a lower lip 24a defined by the opening 24. A peripheral groove 25 is carried on an upper face of the closure member H for positioning an "o" ring 26 to normally provide a seal when the closure member H is in the normal position closing the fluid pressure relief port 22 of the valve member G as illustrated in FIG. 2.

The operator I has an enlarged lower downwardly projecting flange 27 received within the recess 24 of the closure member H. A sealing member in the form of an "O" ring 28 is carried within the flange 27 to normally exclude fluid from the longitudinal bore 29 within the elongated operator I. The relatively weak spring 30 bears in compression on one end against the upper end of the sleeve 19 and against a retaining ring 31 split as at 31a on the other end.

The stop F includes an elongated threaded element 32 which carries an integral shoulder 33 for rotation in the fitting 34. The positioning of the shoulder 33 establishes the space S (FIG. 2) between the stop F and the operator I.

The fitting 34 is carried as by a pressed fit in a reduced upper portion 14b of the housing 14. The shoulder 33 is carried in a recess 34a within the fitting 34 between a pair of washers 35. The washers are confined within the recess 34a as by a suitable retaining member 36. An internally threaded hexagonal abutment 37 having an internally threaded sleeve 37a integral therewith is threadably carried by the elongated threaded element 32. An intermediate portion 14c of the upper housing 14 has an internal wall 38 which is also hexagonal complimentary to the hexagonal abutment 37 permitting sliding axial movement of the abutment therein but preventing rotation relative thereto. The predetermined reduced pressure simulating means including the compression springs 11 and 12 are confined between the abutment 37 and the ribs 13c of the disc 13.

The predetermined simulated pressure exerted by the means D upon the pressure reducing valve A' may be adjusted by turning the threaded element 32 to raise or lower the abutment 37 thus decreasing or increasing the compression of the springs 11 and 12. when the compression of the springs 11 and 12 has been adjusted to reflect a sufficient simulating pressure for desired operation of the fluid pressure reducing valve A the lock nut 39 is tightened.

It will be observed that if for any reason a predetermined pressure greater than the regulated or predetermined reduced pressure occurs in the reduced pressure outlet chamber C that the diaphragm E will flex upwardly permitting fluid to pass through the O-ring 28 and into the bore 29 and out through the bore and the port 29a into the upper housing 14 which is open to the atmosphere as at opening 14a. Should the pressure in the chamber be of sufficient magnitude, upward flexing of the diaphragm will continue until the operator I moves to close the space S contacting the stop F. Further upward movement of the diaphragm E results in a separation of the valve member G and the closure member H as illustrated in FIG. 1. Fluid will then flow, as indicated by the arrows in FIG. 1, through the port formed by the openings 22 in the valve member G into the upper housing 14 for venting through the opening 14a.

If, for example, it is desired to charge containers for carbon dioxide (not shown) from a vessel (not shown) containing carbon dioxide at a high pressure, fluid in the form of carbon dioxide gas from the vessel, enters the high pressure inlet 40 which is provided with suitable internal coupling threads 40a into the high pressure inlet chamber B contained within a lower reduced portion 10a of the lower housing 10. The inlet chamber contains a circumferential screen 41 for removing foreign matter from the fluid prior to its passage into the pressure reducing valve A through the port 42 beneath the piston 43. The piston 43 has a square cross section and is slidably mounted in the fitting 44 which has a cylindrical opening 44a so that passageways are formed between the square piston and the cylindrical opening as illustrated at 45. A compression spring 46 carried within the opening 44a beneath the piston 43 normally urges the piston and the valve member 47 connected thereto by the pin 48 upwardly.

Pressure is exerted by the fluid flowing through the passageways 45 against the lower surface of the yieldable valve seat 49 causing the split annular spring 50 carried within a central opening 49a within the yieldable valve seat to contract allowing fluid to flow through the valve seat at a predetermined reduced pressure, the fluid then flows through the valve member 51 into the reduced pressure outlet chamber and through the regulated pressure outlet 52 which has suitable threads 52a to receive a desired pressure fitting (not shown) through which carbon dioxide flows to a container. The valve seat 51 has a recess 51a receiving the expandable member 49. The valve member 51 has a central opening 51b and is threadably received as at 51c by the housing 10a. The foregoing operation of the valve A and associated parts are described in greater detail in U.S. Pat. No. 3,712,333 which is incorporated herein and made a part hereof by reference.

It may be noted, however, that the valve seat 49 is constructed of a material to contract under high pressure and withstand the effect of carbon dioxide gas. Also the orifice of the valve seat 49 varies in diameter as pressure changes occur. The valve seat 49 is yieldingly urged to its extended or no load position by the split annular spring 50 engaged in the orifice of said valve seat 49. The spring 50 slightly overlaps itself at low pressure and increased the overlapment as the pressure increases. The spring 50 prevents the valve seat from assuming a fixed position when under constant load.

The valve A is actuated to open position by the flexing of the diaphragm under the influence of the springs D and the low pressure in the diaphragm chamber C. This is accomplished by the pin 48 projecting through the valve seat 49. The extension has a valve member 47 contacting the O-ring 28.

The high pressure entering the tapped opening 40 and passing through ports 42 and the passages 45 will contract the valve seat and its spring 50. When the high pressure is reduced and finally exhausted there will be no pressure exerted on valve and the load on the valve seat and its spring 50 will be relieved.

Returning now to the operation of the excess pressure relieving mechanism, it will be seen by reference to FIG. 1 that the relatively weak return spring 30 is sufficient to maintain the sealing relation between the closure members H and the excess pressure relieving valve G during initial upward movement of the diaphragm responsive to excess pressure. If the excess pressure is of sufficient magnitude to cause contact of the operator I with the stop F, it is only necessary to overcome the force of the relatively weak spring 30 to produce separation of the closure member H and the pressure relieving valve G. It is apparent that, regardless of the setting of the compression on the springs 11 and 12 by positioning of the abutment 37 as described to simulate a desired predetermined pressure for operating the valve A, a fixed overpressure as is required to move the operator I through the space S (FIG. 1) between it and the stop F is all that is required to open the excess pressure relieving mechanism hereof to dump the fluid under such pressure. This means that the overpressure setting may be made inherent in the valve, as shown, so that it cannot be tampered with or inadvertently set at the wrong pressure. Thus, the threaded element 32 performs the dual function of the stop and as the means of setting the regulated pressure by positioning the abutment 37.

While a preferred embodiment of the invention has been described using specific terms, such description is for illustrative purposes only, and it is to be understood that changes and variations may be made without departing from the spirit or scope of the following claims.

What is claimed is:

1. A safety device for fluid pressure reducing apparatus having a fluid pressure reducing valve, through which fluid passes from a high pressure inlet chamber to a reduced pressure outlet chamber, operable responsive to a predetermined reduced pressure simulating means carried in alignment with the fluid pressure reducing valve, and a diaphragm interposed between said reduced pressure outlet chamber and said predetermined reduced pressure simulating means including:

a stop carried adjacent said pressure simulating means at a predetermined position on a side of said diaphragm opposite said fluid pressure reducing valve;

a valve member carried by said diaphragm having a fluid relief port communicating with said reduced pressure outlet chamber;

a closure member carried by said diaphragm normally in position closing said fluid relief port;

an operator means carried adjacent said closure member in alignment therewith for actuating said fluid pressure reducing valve adjacent one end thereof responsive to said reduced pressure simulating means; a port extending longitudinally in said operator means;

means sealing said port during such actuation of said fluid pressure reducing valve but which is opened by movement of said operator when pressure in said regulated pressure outlet chamber exceeds said simulated pressure; and said operator means being in spaced relation with said stop adjacent the other end thereof which engages said stop upon further movement of said operator restraining said closure member carried thereby against further movement when said diaphragm and said valve and closure members carried thereby are moved responsive to an excessive pressure in said reduced pressure outlet chamber but permitting further movement of said diaphragm and valve member carried thereby separating said valve member from said closure member;

whereby said fluid relief port is opened permitting fluid to escape therethrough relieving excessive pressure in said reduced pressure outlet chamber.

2. The structure set forth in claim 1 including, a spring carried on said operator normally urging said closure member into sealing engagement with said valve seat but which is overcome by breaking said sealing engagement.

3. A safety device for fluid pressure reducing apparatus having a fluid pressure reducing valve, through which fluid passes from a high pressure inlet chamber to a reduced pressure outlet chamber, operable responsive to a predetermined reduced pressure simulating means, and a diaphragm interposed between said reduced pressure outlet chamber and said predetermined reduced pressure simulating means including:

a stop carried at a predetermined position on a side of said diaphragm opposite said fluid pressure reducing valve;

a valve member carried by said diaphragm having a fluid relief port communicating with said reduced pressure outlet chamber;

a closure member carried on a side of said diaphragm remote from said reduced pressure simulating means normally in position closing said fluid relief port and actuating said fluid pressure reducing valve responsive to said reduced pressure simulating means; and an operator extending through said diaphragm carried by said closure member in spaced relation with said stop when said closure member is in position closing said fluid relief port which engages said stop restraining said closure member against further movement when said diaphragm and said valve and closure members carried thereby are moved responsive to an excessive pressure in said reduced pressure outlet chamber but permitting further movement of said diaphragm and valve member carried thereby separating said valve member from said movable closure member;

whereby said closure member actuates said fluid pressure reducing valve and upon movement of said diaphragm responsive to excessive pressure in said reduced pressure outlet chamber opens said fluid relief port permitting fluid to escape through said fluid relief port relieving such excessive pressure in said reduced pressure outlet chamber.

4. The structure set forth in claim 3 wherein said fluid pressure reducing valve includes operating means extending toward said closure member for engagement therewith.

5. The structure set forth in claim 4 wherein a port extends through said closure member which is normally closed by said operating means.

6. A safety device for fluid pressure reducing apparatus having a fluid pressure reducing valve, through which fluid passes from a high pressure inlet chamber to a reduced pressure outlet chamber, operable responsive to a compression spring simulating reduced pressure, and a diaphragm interposed between said reduced pressure outlet chamber and said compression spring including:

an elongated threaded element carried for rotation at a predetermined position on a side of said diaphragm opposite said fluid pressure reducing valve;

an abutment bearing on an end of said compression spring remote from said diaphragm carried for axial movement on said elongated threaded element responsive to rotation of said elongated threaded element for setting said reduced pressure;

a valve member carried by said diaphragm having a fluid relief port communicating with said reduced pressure outlet chamber;

a closure member carried below said diaphragm normally in position closing said fluid relief port by seating on the underside of said valve member; and an operator carried by said closure member in spaced relation with an adjacent end of said elongated threaded element when said closure member is in position closing said fluid relief port which engages said adjacent end of said elongated threaded element restraining said closure member against further movement when said diaphragm and said valve and closure members carried thereby are moved responsive to an excessive pressure in said reduced pressure outlet chamber but permitting further movement of said diaphragm and valve member carried thereby separating said valve member from said movable closure member;

whereby the elongated threaded element acts as a means for setting said reduced pressure and as a stop opening said fluid relief port permitting fluid to escape therethrough relieving excessive pressure in said reduced pressure outlet chamber.

7. The structure set forth in claim 6 wherein said closure member actuates said fluid pressure reducing valve responsive to said compression spring.

* * * * *